United States Patent
Kuhlmann

(10) Patent No.: US 8,408,593 B2
(45) Date of Patent: Apr. 2, 2013

(54) VEHICLE CABIN WITH AIRBAG SYSTEM

(75) Inventor: Klaus Kuhlmann, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 12/944,639

(22) Filed: Nov. 11, 2010

(65) Prior Publication Data

US 2011/0140399 A1    Jun. 16, 2011

(30) Foreign Application Priority Data

Nov. 11, 2009    (DE) .................... 10 2009 052 691

(51) Int. Cl.
*B60R 21/16*    (2006.01)
(52) U.S. Cl. ........................................ 280/732
(58) Field of Classification Search .................. 280/732, 280/730.2, 741, 729
See application file for complete search history.

(56) References Cited

U.S. PATENT DOCUMENTS

| | | | |
|---|---|---|---|
| 4,043,572 A * | 8/1977 | Hattori et al. ................. | 280/738 |
| 6,536,799 B2 * | 3/2003 | Sinnhuber et al. ............ | 280/735 |
| 6,971,664 B2 * | 12/2005 | Amamori ....................... | 280/729 |
| 2003/0116945 A1 * | 6/2003 | Abe ............................... | 280/729 |
| 2006/0284400 A1 * | 12/2006 | Sakakibara et al. ......... | 280/728.2 |
| 2007/0024036 A1 * | 2/2007 | Song et al. .................... | 280/732 |
| 2007/0267852 A1 * | 11/2007 | Enders ......................... | 280/730.1 |
| 2008/0054602 A1 * | 3/2008 | Yang ............................. | 280/729 |
| 2008/0157508 A1 | 7/2008 | Kato et al. | |
| 2009/0121462 A1 | 5/2009 | Rick | |
| 2011/0101660 A1 * | 5/2011 | Schneider et al. ............ | 280/731 |

FOREIGN PATENT DOCUMENTS

| | | |
|---|---|---|
| DE | 3934588 A1 | 4/1991 |
| DE | 19628837 A1 | 1/1997 |
| DE | 19860823 A1 | 7/2000 |
| DE | 19904100 A1 | 8/2000 |
| DE | 19914214 A1 | 10/2000 |
| DE | 20019126 U1 | 4/2001 |
| DE | 10154694 A1 | 5/2003 |
| DE | 10216900 A1 | 3/2004 |
| DE | 60209424 T2 | 10/2006 |
| DE | 102007052974 A1 | 5/2009 |
| DE | 102009012740 A1 * | 9/2010 |
| GB | 2454578 A | 5/2009 |
| JP | 2011056992 A * | 3/2011 |

OTHER PUBLICATIONS

German Patent Office, German Search Report for German Application No. 102009052691.9, dated Sep. 30, 2010.

* cited by examiner

*Primary Examiner* — Faye M. Fleming
(74) *Attorney, Agent, or Firm* — Ingrassia Fisher & Lorenz, P.C.

(57) ABSTRACT

A vehicle cabin having a vehicle seat is provided and the vehicle seat is aligned in a frontal direction. An instrument panel extends on the front side toward the vehicle seat and forms a foot well in the perpendicular projection onto a projection plane that is defined by a vehicle floor or sections thereof. A leg space extends between the foot well and the vehicle seat, and an airbag system is provided that is integrated at least in sections in the instrument panel and which has a prebag and an airbag. In the inflated state, the airbag is supported on the prebag. In the projection plane, the leg space in the frontal direction is at least twice as long, preferably at least three times as long as the foot well.

20 Claims, 2 Drawing Sheets

VEHICLE CABIN WITH AIRBAG SYSTEM

CROSS-REFERENCE TO RELATED APPLICATION

This application claims priority to German Patent Application No. DE 102009052691.9, filed Nov. 11, 2009, which is incorporated herein by reference in its entirety.

TECHNICAL FIELD

The technical field relates to a vehicle cabin having a vehicle seat that is aligned in a frontal direction, having an instrument panel. The instrument panel extends on the front side toward the vehicle seat and the instrument panel forms a foot well in the perpendicular projection onto a projection plane that is defined by a vehicle floor or sections thereof. Leg space extends between the foot well and the vehicle seat in particular in the central position, and an airbag system is integrated at least in sections in the instrument panel that has a prebag and an airbag. The inflated state the airbag is supported on the prebag.

BACKGROUND

In present-day vehicles it is usual that an instrument panel is disposed in the interior of the vehicle opposite the front vehicle seats, in which an airbag is integrated at least for the passenger. These instrument panels are usually configured to be voluminous and offer space for the installation of heater components, glove boxes, air conditioning system components etc. On the upper side, these instrument panels have a flap or the like which is opened upon activation of the airbag system so that the airbag can expand from the instrument panel into the interior and protect the passenger.

Airbags that expand more than one airbag upon activation are known from many documents. The document DE 10 216 900 A1, for example, discloses an airbag system for motor cycles which comprises a front airbag near the handlebar and an adjoining rear airbag near the rider. The rear airbag acts as an energy absorption airbag and the front airbag acts as a ramp airbag or flyover airbag.

Known from the document DE 198 60 823 A1 is an occupant protection apparatus comprising a passenger airbag in an automobile. The automobile is configured as a small passenger car which for reasons of space dispenses with an instrument panel in the region of the passenger. The airbag system is installed behind a bulkhead outside the vehicle interior in front of the passenger seat. In some embodiments, the airbag system comprises two airbags, which are supported on one another and which are supplied by separate gas generators during expansion.

The document DE 602 094 24 T2 relates to a passenger-side airbag apparatus for an automobile, which comprises an airbag having two regions which are fluidly interconnected and supplied by the same gas generator during expansion. The airbag system is installed in a conventional instrument panel. This document probably forms the nearest prior art.

In view of the foregoing, it is the object to provide a vehicle cabin which enables a pleasant, fatigue-free, and at the same time safe journey in a vehicle. In addition, other objects, desirable features and characteristics will become apparent from the subsequent summary and detailed description, and the appended claims, taken in conjunction with the accompanying drawings and this background.

SUMMARY

A vehicle cabin is provided that is suitable and/or configured for a motor vehicle, in particular an automobile. The vehicle cabin comprises at least one vehicle seat, which is aligned in a frontal direction, which preferably corresponds to the usual direction of travel of the vehicle. The vehicle seat can be implemented as a driver's seat, a passenger seat, and/or a middle seat.

Integrated in the vehicle cabin is an instrument panel, which extends at least in sections on the front side of the vehicle seat. In particular, the instrument panel extends perpendicularly to the frontal direction. The instrument panel can extend over the entire width of the vehicle cabin or it can be formed merely in partial regions, for example, merely in front of the vehicle seat. In the simplest form, the instrument panel is a plastic body, which in a perpendicular cross section parallel to the frontal direction through the vehicle cabin toward the driver seat forms a semicircular and/or rounded shape. The instrument panel can have functional components, but in modified embodiments this is largely formed without functional components.

The space below the instrument panel is the foot well. In particular, it is specified that the space obtained through a perpendicular projection of the instrument panel onto a projection plane defined by a vehicle floor of the vehicle cabin or sections thereof, forms a foot well for a passenger sitting on the vehicle seat.

A leg space for the passenger extends between the foot well and the vehicle seat, which as a reference position is preferably locked in a middle position between a front most and a rear most position. In some embodiments, the projection plane is defined by the vehicle floor section in the leg space. In these embodiments, the vehicle floor in the region of the foot well can already be configured to be bent at an angle to the projection plane. In these embodiments, the projection plane is conceptually extended into the foot well to allow the projection of the instrument panel.

The vehicle cabin has an airbag system which is integrated into the instrument panel, at least in sections. In some embodiments, the airbag system forms the only fitting, i.e., the only controllable element of the instrument panel. The airbag system comprises a prebag and an airbag, wherein in the inflated state, i.e., after activation of the airbag system, the airbag is supported on the prebag, in particular in the frontal direction. In other words, the prebag forms an extension for the airbag on the path between the instrument panel and the vehicle seat or the passenger on the vehicle seat.

Within the framework of the invention it is disclosed that in the projection plane, the length of the leg space in the frontal direction, in particular in a region centrally to the vehicle seat, is configured to be at least twice as long, preferably at least three times as long as the length of the foot well in the projection plane in the same alignment. It is consequently proposed that the instrument panel and the vehicle seat are disposed and/or configured in such a manner that in the vehicle cabin, a feeling of great space ensues for the passenger.

However, this increase in traveling comfort and consequently improvement of fatigue-free driving appreciably increases the requirements for the airbag system in regard to a free space to be bridged between instrument panel and passenger in the vehicle seat, wherein an at least two-part airbag arrangement is disclosed as an airbag system according to the invention in order to allow safe travel at the same time.

Alternatively or additionally, the region at the front of the vehicle seat is set back with respect to other regions so that the leg space is enlarged and the feeling of great space is promoted. In particular, the instrument panel in this region is set back with respect to or another instrument panel in front of the driver's seat. Due to the setting back, the distance between the instrument panel and a passenger is increased, for example, by at least approximately 15 cm, in particular by at least approximately 30 cm.

In one possible constructive embodiment of the invention, it is provided that the leg space in the frontal direction in the projection plane extends over at least approximately 40 cm, preferably over at least approximately 50 cm, and in particular over at least approximately 60 cm. An alternative or additional constructive embodiment can provide that the shortest distance between the perpendicular projection of a front-side end point of the seat surface of the vehicle seat in the middle position and the perpendicular projection of an edge point of the instrument panel on the projection plane is greater than approximately 40 cm, preferably greater than approximately 50 cm, and in particular greater than approximately 60 cm. These constructive embodiments underline once again the striving for a feeling of great space in the vehicle cabin.

In an alternative or additional definition, it can be stipulated that the shortest distance between an outlet for the prebag and the airbag in the instrument panel and a perpendicular to the projection plane through a point of the seat surface of the vehicle seat adjoining the seat rest in the middle position is greater than approximately 70 cm, preferably greater than 80 cm, and in particular greater than 90 cm. This distance describes the bridging distance which must be bridged by the combination of prebag and airbag as far as the normal position of the head of a person on the driver's seat in the event of an activation.

In a first embodiment of the invention, the prebag and the airbag are fluidly interconnected and/or are connected to a common gas generator. This embodiment reduces the requirements on the control technology and leads to a cost-effective system. However, since it is a technical challenge to simultaneously inflate the prebag and the airbag by a common gas generator, it is preferred that each of the air bags is each assigned its own gas generator. Instead of a common gas generator which must be configured to expand a very large common volume, two gas generators are proposed, which upon activation, each only need to supply a gas volume of standard size.

Since the prebag is disposed between the airbag and the instrument panel and does not come in direct contact with the passenger in the event of an accident, it is preferable that in the inflated state, the prebag has a higher internal pressure than the airbag. The passenger can then be gently captured in the airbag, the harder prebag forming a stable mechanical support for the airbag. From the same reasoning, it is optionally possible that the prebag is made of a harder or more resistant material and/or is fitted with fewer or smaller outlet openings than the airbag, in particular so that the prebag remains substantially longer in the inflated state without restricting the view to the front for the occupants. Whereas the material of the airbag must be adapted to the passenger, the material for the prebag, i.e., for the skin of the prebag, can be selected arbitrarily.

In another embodiment, the airbag system is configured in terms of program technology and/or circuitry such that the activation of the prebag takes place temporally before the activation of the airbag and/or that the inflation speed of the prebag is greater than the inflation speed of the airbag. Since the passenger does not come in direct contact with the prebag, this can be inflated more rapidly than the airbag without the prebag being able to injure the passenger in the event of a collision if the inflation speed is too high.

From the constructive viewpoint, it is advantageous if, in the inflated state, the prebag substitutes for the supporting function of a conventional instrument panel. This embodiment once again underlines the inventive idea of replacing a conventional instrument panel by a reduced-size instrument panel with regard to the airbag system, wherein the missing volume between the conventional instrument panel and the reduced-size instrument panel is replaced by the prebag and/or the increased distance between the occupant and the reduced-size instrument panel is bridged by the prebag.

In another embodiment, in the inflated state, the prebag can form a knee airbag and/or a knee retaining function. This possibility is provided by the instrument panel being set back compared with a conventional instrument panel so that the prebag has sufficient space to travel between the passenger and the instrument panel.

In another embodiment, in the inflated state, the airbag has lateral projections which form a side impact protection airbag. For example, a projection can be provided which secures the passenger with respect to the A-pillar of the vehicle. In a projection on the projection plane, for example, the airbag can have an L-shaped or bracket-like shape to embrace the passenger in a protective manner on one side or on both sides.

In another embodiment, in the inflated state, prebag and airbag have a similar volume. A similar volume exists if the volume difference accounts for less than approximately 10% of the volume of the larger air bag. Accordingly, in the event that two separate gas generators are used, these can be configured to be of the same design or at least similar.

In another embodiment, the airbag system is configured as a driver or passenger system. A configuration as a driver system is possible particularly if the steering wheel of the vehicle is suitably configured so that prebag and airbag have sufficient room for expansion. In order to reduce the size of the instrument panel, it can optionally be implemented that functional components such as, for example, glove box, air-conditioning system, and/or heating system are disposed outside the instrument panel.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
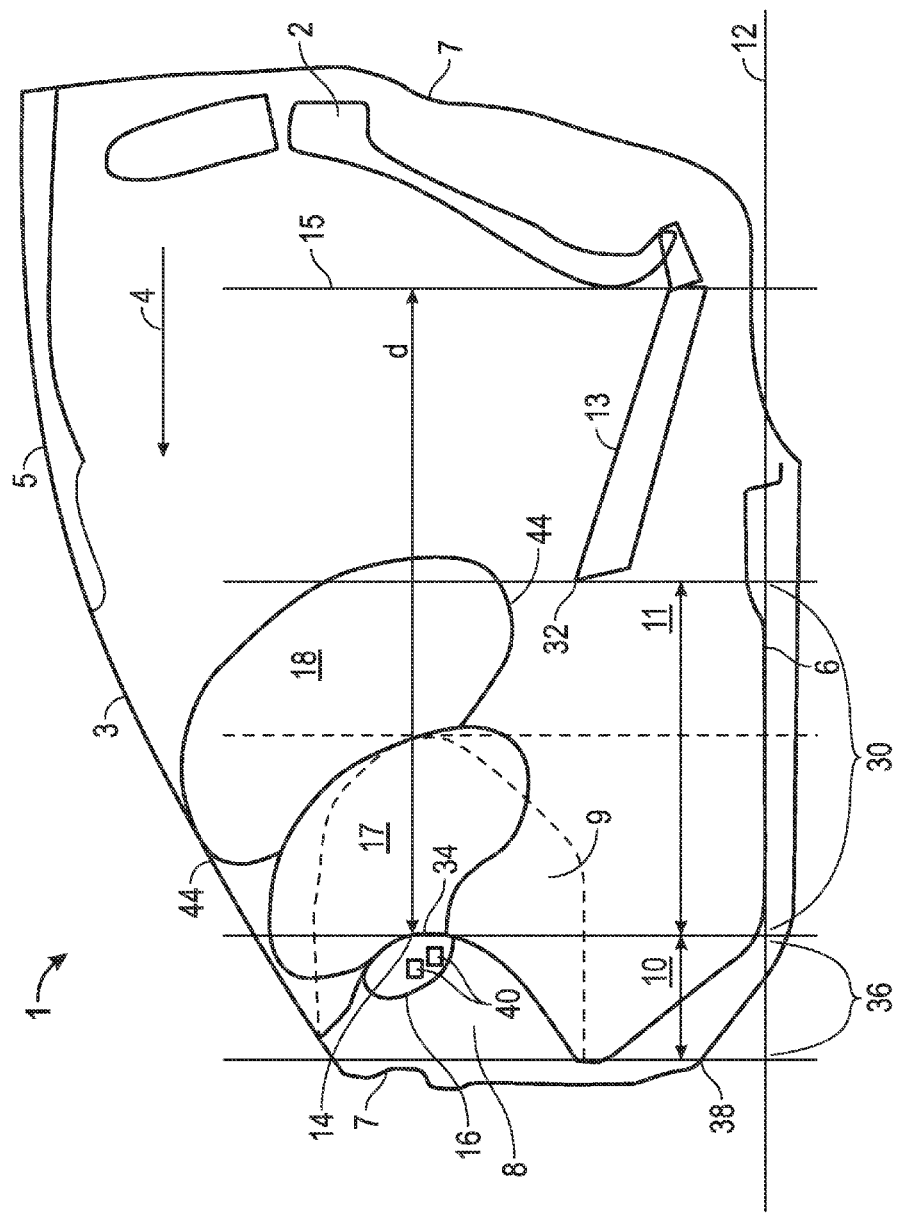
FIG. 1 shows a schematic sectional view through a vehicle cabin as an exemplary embodiment of the invention.

Located in the vehicle cabin is a vehicle seat 2 with a head rest, the section in FIG. 1 running approximately centrally through the vehicle seat 2. Depicted schematically are a windshield 3 in the frontal direction 4 to the vehicle seat 2, an adjoining vehicle roof 5, and a vehicle floor 6. The diagram of the vehicle cabin 1 is delimited by discontinued edges 7 at the edges. An instrument panel 8 is disposed in the frontal direction 4 of the vehicle seat 2, which instrument panel extends over the vehicle width or parts of the vehicle width in the region of the vehicle seat 2. Compared with a conventional instrument panel 9, which is shown by dashed lines in FIG. 1, the instrument panel 8 is highly set back or reduced in size in the frontal direction 4. The reduced size of the instrument panel 8 has the result that a passenger in the vehicle seat 2 perceives a feeling of great space and in this way, traveling with the vehicle is perceived to be more pleasant and less tiring than with a conventional instrument panel 9.

The region in front of the vehicle seat 2 can be divided into a foot well 10 and into a leg space 11. The vehicle floor 6 is configured to be approximately horizontal in the region of the leg space 11 and defines a projection plane 12. The foot well 10 is defined as the free volume which is obtained underneath the instrument panel 8 in perpendicular projection of the instrument panel 8 onto the projection plane 12. The leg space 11 directly adjoins the foot well 10 and is delimited in the direction of the vehicle seat 2 by the front most point of the seat surface 13 of the vehicle seat.

As is deduced from a comparison with the projection of the conventional instrument panel 9, in the vehicle cabin 1, the foot well 10 is substantially smaller and in this exemplary embodiment, is restricted to the part of the vehicle floor 6 which is already disposed at an angle to the projection plane 12. The ratio between the length of the leg space 11 and the foot well 10 in the frontal direction 4 in the section shown is greater than approximately 2:1 or even greater than approximately 3:1. Alternatively, stated, and as shown in FIG. 1, in one embodiment, the leg space 11 in the frontal direction comprises a first distance 30 within the projection plane 12 between a front end 32 of the vehicle seat 2 and a rear end 34 of the instrument panel 8; the foot well 10 comprises a second distance 36 in the projection plane 12 between the rear end 34 of the instrument panel 8 and a front end 38 of the vehicle cabin 1; and the first distance 32 is at least twice as long as (and is preferably at least three times as long as) the second distance 36.

Another interesting characteristic is the shortest distance ed between an outlet opening 14 in the instrument panel 8 and a perpendicular 15 located perpendicular to the projection plane 12 and running through the backrest-side boundary of the seat surface 13. This distance d is greater than approximately 60, preferably greater than approximately 70, and in particular greater than approximately 80 cm. The perpendicular 15 at the same time approximately illustrates the position of a passenger in the vehicle seat 2. For the purpose of the sizes shown, the vehicle seat 2 is moved into a normal position, in particular in a middle position of its possibilities for displacement.

An airbag system 16, which is configured as a front airbag system, is integrated in the instrument panel 8. As a result of the large distance between the outlet opening 14 and the position of the passenger, the airbag system 16 has a two-stage airbag arrangement with a prebag 17 and an airbag 18, which are expanded by means of one or more gas generators 40 upon activation of the airbag system 16. In certain embodiments, the prebag 17 and the airbag 18 are connected to the same gas generator 40. In other embodiments, the prebag 17 and the airbag 18 are connected to different gas generators 40. The airbag 18 is supported on the prebag 17 so that the prebag 17 is disposed between airbag 18 and instrument panel 8. As noted in the Summary section above, in certain embodiments, in the inflated state, the airbag 18 has lateral projections 44 which form a side impact protection airbag.

As is deduced from FIG. 1, in the sectional region shown the prebag 17 approximately replaces the design of the conventional instrument panel 9 and thereby substitutes the supporting function of the conventional instrument panel 9 for the airbag 18. The two-stage airbag arrangement has the advantage that the large distance between outlet opening 14 and position (perpendicular 15) of the passenger can be bridged.

As shown in FIG. 1, prebag 17 and airbag 18 can have approximately the same cross-sectional area. The shape of prebag 17 and airbag 18 can, however, be configured differently so that, the prebag 17, for example, can extend parallel to the instrument panel 8 whereas the airbag 18 can also have projections, not shown, which provide a lateral protection function for the passenger. Prebag 17 and airbag 18 are inflated by two different gas generators so that it is possible to design the expansion dynamics differently for the two airbags. Thus, for example, the prebag 17 can be inflated more rapidly and harder than the airbag 18 in order to bridge the distance d after a short reaction time. At the same time, the airbag 18 is expanded at low and/or moderate speed in order not to injure the passenger. In further embodiments, the prebag 17 can additionally be configured as a knee airbag.

Figure 2:
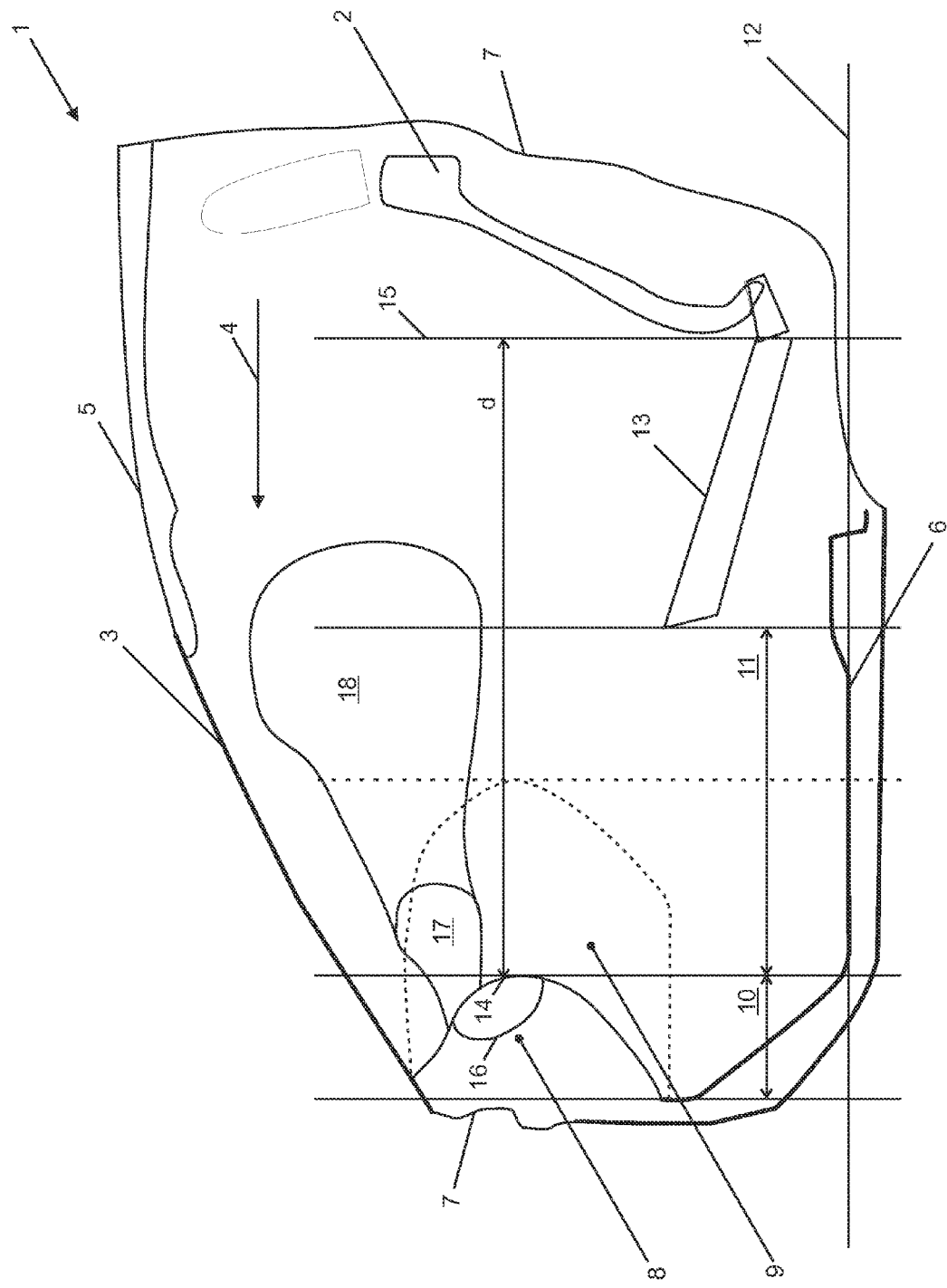
FIG. 2 shows the vehicle cabin in FIG. 1 in the same view with an alternative design of the airbag system.

FIG. 2 shows a second embodiment of the vehicle cabin 1, wherein the prebag 17 and the airbag 18 are configured differently from the design in FIG. 1. In FIG. 1 both prebag 17 and airbag 18 abut against the windshield 3 in the inflated state whereas in FIG. 2, prebag 17 and airbag 18 deploy at a distance from the windshield 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle cabin, comprising:
    a vehicle seat substantially aligned in a frontal direction;
    an instrument panel extending on a front side toward the vehicle seat;
    a foot well extending between the instrument panel and a vehicle floor;
    a leg space extending between the foot well and the vehicle seat; and
    an airbag system at least integrated in sections in the instrument panel, the airbag system comprising a prebag and an airbag,
    wherein in an inflated state the airbag is supported on the prebag in a direction of travel such that that the prebag and the airbag are configured to form a protection for an occupant in the vehicle cabin, and
    wherein in a projection plane defined by at least sections of the vehicle floor, the leg space in the frontal direction is at least twice as long as the foot well.

2. The vehicle cabin according to claim 1, wherein the leg space in the frontal direction in the projection plane extends over at least approximately 40 cm.

3. The vehicle cabin according to claim 1, wherein:
    the leg space in the frontal direction comprises a first distance within the projection plane between a front end of the vehicle seat and a rear end of the instrument panel;
    the foot well comprises a second distance between the rear end of the instrument panel and a front end of the vehicle cabin; and the first distance as at least twice as long as the second distance.

4. The vehicle cabin according to claim 1, wherein the leg space in the frontal direction in the projection plane extends over at least approximately 60 cm.

5. The vehicle cabin according to claim 1, wherein a shortest distance between an outlet for the prebag in the instrument panel and substantially perpendicular to the projection plane through a point of a seat surface of the vehicle seat adjoining a seat rest in a middle position is greater than approximately 70 cm.

6. The vehicle cabin according to claim 1, wherein a the first distance is at least three times as long as the second distance.

7. The vehicle cabin according to claim 1, wherein a shortest distance between an outlet for the prebag in the instrument panel and substantially perpendicular to the projection plane through a point of a seat surface of the vehicle seat adjoining a seat rest in a middle position is greater than approximately 90 cm.

8. The vehicle cabin according to claim 1, wherein the prebag and the airbag are connected to a common gas generator.

9. The vehicle cabin according to claim 1, wherein in the inflated state the prebag has a first internal pressure that is greater than a second internal pressure of the airbag.

10. The vehicle cabin according to claim 1, wherein a first inflation speed of the prebag is greater than a second inflation speed of the airbag.

11. The vehicle cabin according to claim 1, wherein in the inflated state, the airbag has lateral projections which form a side impact protection airbag.

12. A vehicle cabin, comprising:
a vehicle seat substantially aligned in a frontal direction;
an instrument panel extending on a front side toward the vehicle seat;
a foot well extending between the instrument panel and a vehicle floor;
a leg space extending between the foot well and the vehicle seat; and
an airbag system at least integrated in sections in the instrument panel, the airbag system comprising a prebag and an airbag,
wherein in an inflated state the airbag is supported on the prebag in a direction of travel such that that the prebag and the airbag are configured to form a protection for an occupant in the vehicle cabin,
wherein the instrument panel on the front side of the vehicle seat is set back with respect to another section of the instrument panel on the front side of another vehicle seat in order to enlarge the leg space.

13. The vehicle cabin according to claim 12, wherein the prebag and the airbag are connected to a common gas generator.

14. The vehicle cabin according to claim 12, wherein in the inflated state the prebag has a first internal pressure that is greater than a second internal pressure of the airbag.

15. The vehicle cabin according to claim 12, wherein a first inflation speed of the prebag is greater than a second inflation speed of the airbag.

16. The vehicle cabin according to claim 12, wherein in the inflated state, the airbag has lateral projections which form a side impact protection airbag.

17. The vehicle cabin according to claim 12, wherein the prebag is assigned a first gas generator and the airbag is assigned a second gas generator.

18. The vehicle cabin according to claim 12, wherein in the inflated state, the prebag is adapted to form a knee airbag.

19. The vehicle cabin according to claim 12, wherein in the inflated state, the airbag comprises a lateral projection that at least partially form a side impact protection airbag.

20. The vehicle cabin according to claim 12, wherein in the inflated state the prebag has a first volume and the airbag has a second volume that is substantially equal to the first volume.

* * * * *